US010344734B2

(12) United States Patent
Philippart et al.

(10) Patent No.: US 10,344,734 B2
(45) Date of Patent: Jul. 9, 2019

(54) DETERMINING SLIDING CAMSHAFT ACTUATOR PIN POSITION BASED ON ENGINE CRANKSHAFT ANGLE

(71) Applicant: GM GLOBAL TECHNOLOGY OPERATIONS LLC, Detroit, MI (US)

(72) Inventors: Timothy P Philippart, Orion, MI (US); Douglas R Verner, Sterling Heights, MI (US); Dimitri Karatsinides, Milford, MI (US); Timothy Karnjate, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 96 days.

(21) Appl. No.: 15/637,507

(22) Filed: Jun. 29, 2017

(65) Prior Publication Data
US 2019/0003446 A1  Jan. 3, 2019

(51) Int. Cl.
*F02P 7/077* (2006.01)
*F01L 1/25* (2006.01)
*F02D 41/22* (2006.01)
*F01L 13/00* (2006.01)
*F02B 77/08* (2006.01)
*F02D 41/00* (2006.01)

(52) U.S. Cl.
CPC ............ *F02P 7/0775* (2013.01); *F01L 1/25* (2013.01); *F02D 41/22* (2013.01); *F01L 2013/113* (2013.01); *F01L 2820/041* (2013.01); *F02B 77/082* (2013.01); *F02D 41/009* (2013.01)

(58) Field of Classification Search
CPC ...... F02P 7/0775; F01L 1/25; F01L 2013/113; F01L 2820/041; F02B 77/082; F02D 41/009
See application file for complete search history.

(56) References Cited

U.S. PATENT DOCUMENTS

2014/0303873 A1*  10/2014  Glugla ............... F01L 13/0036
                                                   701/103
2016/0125991 A1*  5/2016   Wardle ............... F01L 13/0036
                                                   335/232

\* cited by examiner

*Primary Examiner* — Mark A Laurenzi
*Assistant Examiner* — Wesley G Harris

(57) ABSTRACT

A method of determining a sliding camshaft actuator pin position based on engine crankshaft angle includes commanding a sliding camshaft actuator to perform a valve step shift, and monitoring an actuator's pin position during the valve step shift command. At least one crank angle is measured when the actuator pin position reaches or exceeds at least one predetermined pin position threshold and at least one remedial action is performed when the actuator pin position does not correlate to the at least one measured crank angle.

19 Claims, 4 Drawing Sheets

DETERMINING SLIDING CAMSHAFT ACTUATOR PIN POSITION BASED ON ENGINE CRANKSHAFT ANGLE

TECHNICAL FIELD

The present invention generally relates to sliding camshaft actuators for variable valve lift (WL) systems and, more particularly, relates to a method of determining a sliding camshaft actuator pin position based on engine crankshaft angle.

BACKGROUND

Internal combustion engines include intake and exhaust valves that can be actuated by cam lobes of at least one camshaft. In some configurations the camshafts are constructed with sliding camshaft assemblies having multiple steps for varying the lift distance of an engine valve. For example, a two-step sliding camshaft may include a high lift cam lobe position for lifting an engine valve to a maximum distance, and a low lift cam lobe position for lifting the engine valve below the maximum lift distance.

At least one sliding camshaft actuator is fixed on an internal combustion engine for changing position between the multiple cam lobes. Particularly, at least one actuator pin of a camshaft actuator is operative to selectively engage displacement grooves configured on the periphery of camshaft barrels formed on the sliding camshaft assembly. As the camshaft assembly rotates, an actuator pin is selected to move into a displacement groove of the camshaft barrel which causes the sliding camshaft assembly to shift into a different position along the camshaft axis. When a sliding camshaft shifts position, the intake and/or exhaust valves are actuated differently in accordance with the changed cam lobe position, e.g., a sliding camshaft may move from a high lift cam lobe position to a low lift cam lobe position, which in turn will cause the engine operation to be different.

Thus, the sliding camshaft actuator is an important component in the proper operation of a VVL sliding camshaft system, particularly the actuator's pin position relative to extending into, and retracting from, the displacement grooves formed in the camshaft barrels. The actuator's pin position is tracked by a sensing device which outputs a digital signal indicative of the pin position, e.g., a duty cycle value that represents the amount of distance the pin is ejected from the solenoid; a high value of duty cycle equals retracted while a low value of duty cycle equals ejected (max distance). Monitoring the pin position sensor output signal allows the engine controller to determine if the camshaft actuator is responding properly to its commands to actuate the pin(s) to change variable valve lift status as well as determine if the pins are being acted upon appropriately by the physical ramp geometries present in the grooves that guide the sliding cam barrels.

In addition to having a means for monitoring a camshaft actuator's pin position in response to a command, there is a need for a means to determine if the actual pin position is correct in accordance with the command provided to ensure intended engine performance is a achieved.

BRIEF SUMMARY

One or more exemplary embodiments address the above issue by providing a method of determining a sliding camshaft actuator pin position based on engine crankshaft angle.

According to an aspect of an exemplary embodiment, a method of determining a sliding camshaft actuator pin position based on engine crankshaft angle includes commanding a sliding camshaft actuator to perform a valve step shift. Still another aspect according to the exemplary embodiment includes monitoring an actuator pin position during the valve step shift command. And another aspect includes measuring at least one crank angle when the actuator pin position reaches or exceeds at least one predetermined position threshold. And yet another aspect of the exemplary embodiment includes performing at least one remedial action when the actuator pin position does not correlate to the at least one measured crank angle.

Still another aspect of the exemplary embodiment further includes performing at least one remedial action after the actuator pin position does not correlate to the at least one measured crank angle two consecutive times. And another aspect wherein monitoring further comprising using a Hall Effect sensor to determine the actuator pin position. And a further aspect wherein measuring further comprises using a crank sensor along with at least one camshaft sensor to determine the crank angle. Yet a further aspect includes measuring a first crank angle when the actuator pin position extends to greater than or equal to a first predetermined position threshold. And still another aspect in accordance with the embodiment includes measuring a second crank angle when the actuator pin position extends to greater than or equal to a second predetermined position threshold. And yet another aspect includes measuring a third crank angle when the actuator pin position retracts to less than or equal to a third predetermined position threshold.

Another aspect in accordance with the exemplary embodiment wherein performing at least one remedial action further comprises setting a diagnostic fault code. And another aspect wherein performing at least one remedial action further comprises activating a service lamp/alarm. And still another aspect further includes performing at least one remedial action when the actuator pin position does not reach or exceed at least one predetermined position threshold.

BRIEF DESCRIPTION OF THE DRAWINGS

The present exemplary embodiment will hereinafter be described in conjunction with the following drawing figures, wherein like numerals denote like elements.

DETAILED DESCRIPTION

The following detailed description is merely exemplary in nature and is not intended to limit the embodiment or the application and uses thereof. Furthermore, there is no intention to be bound by any theory presented in the preceding background or the following detailed description.

Figure 1:
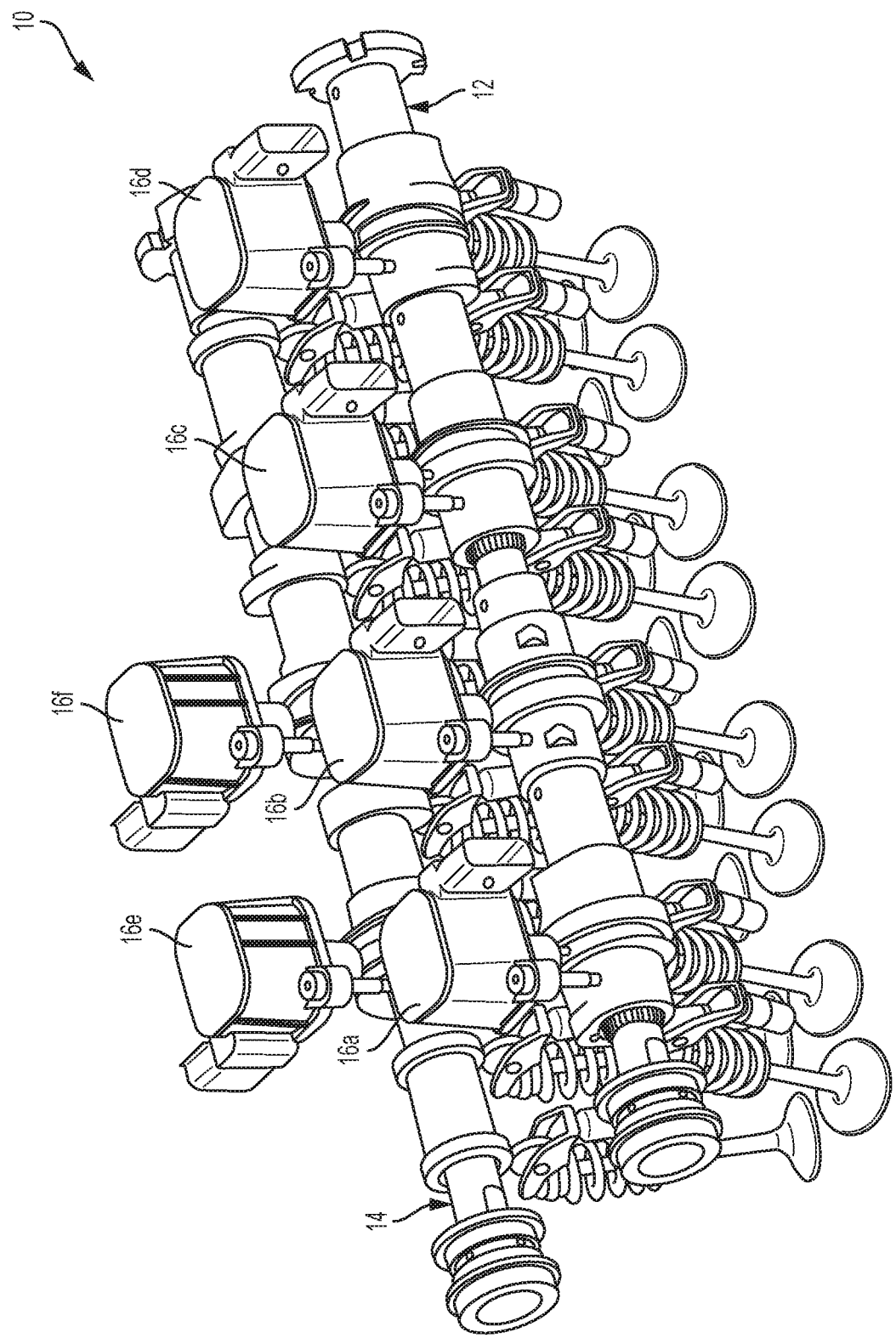
FIG. 1 is an illustration of an intake and an exhaust sliding camshaft configuration for a 4 cylinder internal combustion engine in accordance with aspects of an exemplary embodiment.

In accordance with the disclosed embodiment, FIG. 1 is an illustration of an intake and an exhaust sliding camshaft configuration for a 4 cylinder internal combustion engine camshaft system 10 in accordance with aspects of an exemplary embodiment. It is appreciated that the 4 cylinder embodiment is merely exemplary and the concept of sliding camshaft barrel position sensing may be applied to other multiple cylinder engine camshaft system configurations, e.g., 5, 6, 8, 9, or 12, without exceeding the scope of the invention.

The camshaft system 10 includes at least one sliding camshaft having at least one camshaft barrel. In this case, the camshaft system 10 includes a three (3) step intake valve sliding camshaft 12 and a two (2) step valve exhaust sliding camshaft 14. For shifting the position of the three step intake valve 12 and two step exhaust valve 14 sliding camshafts, at least one camshaft actuator 16 is provided in selective communication with the camshafts and are commanded on and off by a control module, e.g., engine control module (not shown). Particular to this embodiment, camshaft system 10 includes a plurality of actuators (16a-16f) with actuators (16a-16d) being operative for shifting the three step intake valve sliding camshaft 12, and actuators (16e-16f) being operative for shifting the two step exhaust valve sliding camshaft 14 when a valve step shift is commanded by the controller.

Figure 2:
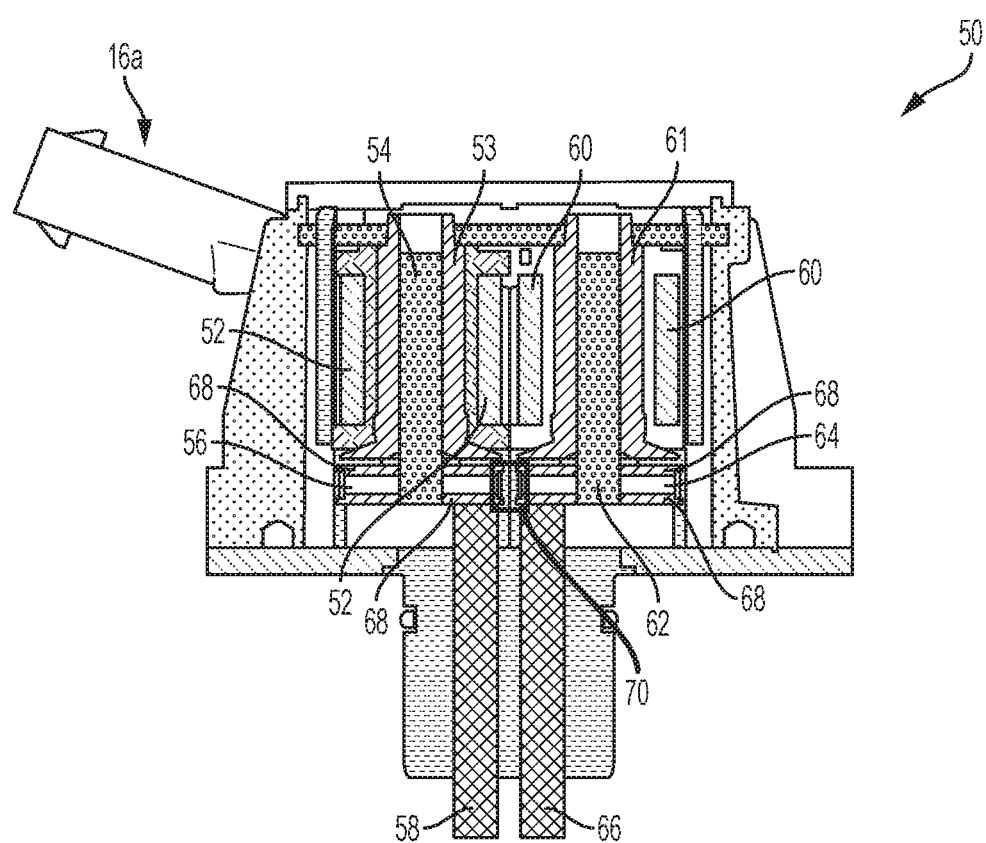
FIG. 2 is an illustration of a cross sectional view of a sliding camshaft actuator in accordance with aspects of the exemplary embodiment.

Referring now to FIG. 2, an illustration 50 of a cross sectional view of a sliding camshaft actuator (16a) is provided in accordance with aspects of the exemplary embodiment. The sliding camshaft actuator 16a includes a first magnetic field generating coil 52 wound on a spool 53 that shrouds a sliding armature 54 within its core. A magnet 56 is disposed between metal plates 68 and fixed at a bottom end of the sliding armature 54. The first magnetic field generating coil 52, the sliding armature 54, and magnet 56 are operative to cause a first actuator pin 58 to be extended into a camshaft barrel as necessary for purposes of shifting the position of the three step intake sliding camshaft 12 in accordance with aspects of the exemplary embodiment. A pin position sensing device 70, preferably a Hall Effect sensor, is provided for tracking the position of the actuator pin(s) and outputting a digital signal indicative of the pin position to a control module, i.e., engine control module (not shown).

A crankshaft position sensor (not shown) is disposed at or near the crankshaft (not shown) and is operable to determine the crankshaft angle during a complete piston combustion cycle, e.g., intake and exhaust cycle, as the crankshaft spins. At least one camshaft position sensor (not shown) disposed at or near the camshaft (not shown) may be used in conjunction with crankshaft position sensor (not shown) to determine engine crank angle (engine position). It is appreciated that an engine crankshaft is a mechanical component that is able to perform a conversion between reciprocating motion of a piston into rotational motion of an engine output shaft(s). The engine crankshaft includes a pulley on at least one end which communicates with a camshaft pulley, i.e., in this case a sliding camshaft pulley, via a belt or chain linkage. The rotational ratio between a crankshaft pulley and the camshaft pulley is substantially 2:1, i.e., for every 720° rotation of the crankshaft, the camshaft will rotate 360°. A sliding camshaft actuator pin is electronically controlled to extend and retract at predetermined angles during a crankshaft's rotation or duty cycle. The crankshaft position sensor is in communication with the engine controller which is operable to determine the rotational angle of the crankshaft at any time during a duty cycle.

It is appreciated that the output signal from the pin position sensing device 70 may be used in combination with the output signal from the crankshaft position sensor such that a correlation can be made between the pin position of a camshaft actuator and the crankshaft angle, i.e., crank angle, at any time during engine operation. For example, a valve step shift command from the engine controller will cause a camshaft actuator to extend a pin into a shifting groove of the sliding camshaft barrel such that a valve step shift occurs. After completing the valve step shift, e.g., from a high valve lift position to a low valve lift position, the actuator pin retracts back into the actuator until a subsequent shift command is received. During any valve step shift command, the control module operates to correlate an actuator's pin position with the current angle of the crankshaft such that if a particular pin position is known then a relative crankshaft angle is determinable.

Figure 3:
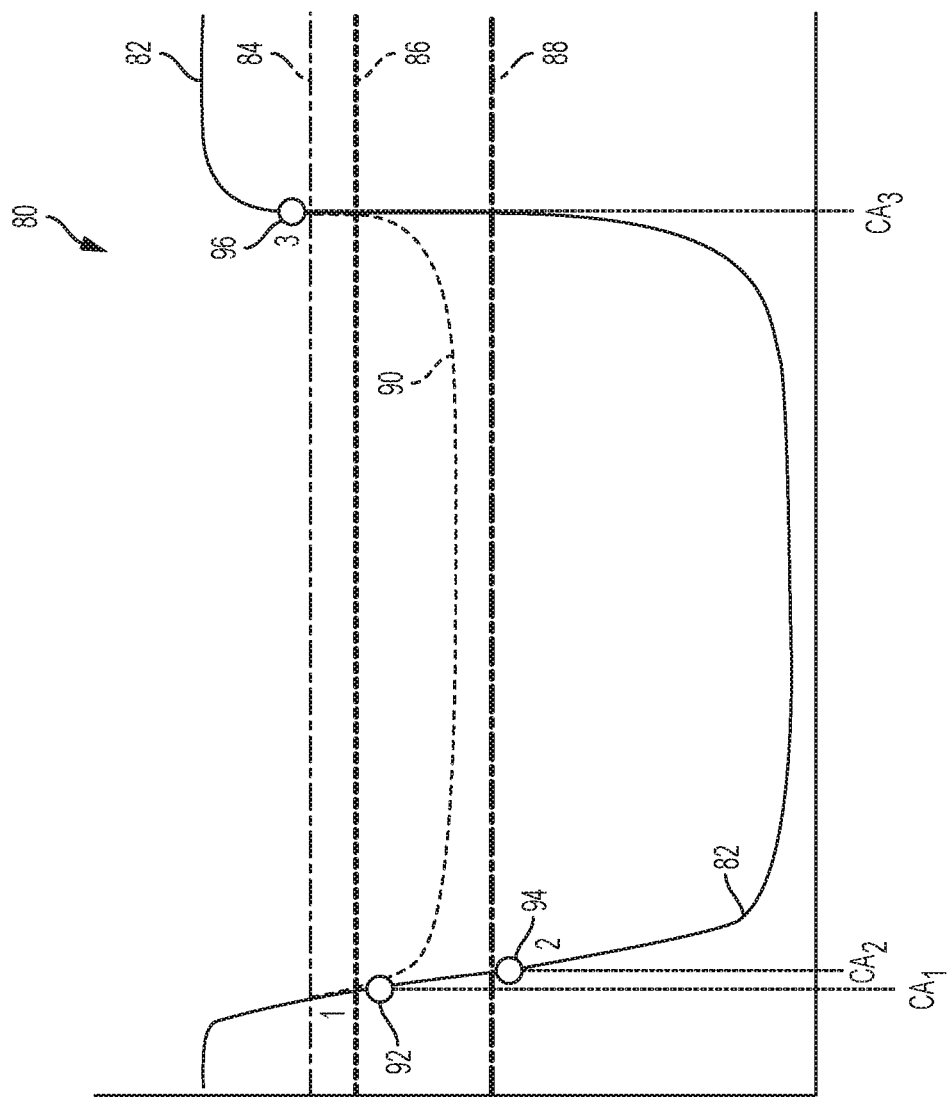
FIG. 3 is a line graph with data to correlate pin position (height) to engine crank angle in accordance with aspects of the exemplary embodiment.

Referring now to FIG. 3, a line graph 80 with data to correlate pin position to engine crank angle in accordance with aspects of the exemplary embodiment is provided. The line graph 80 includes an expected pin position travel profile 82 which correlates pin position (height) to engine crank angle. More particularly, the line graph 80 includes a retracted actuator pin threshold 84, an extending actuator pin threshold 86, and a fully extended actuator pin threshold 88. A partially extended actuator pin event travel profile 90 that resulted from a mis-timing of pin actuation with respect to the groove ramp geometry is recognized as a fault by the control module. In such case, at least remedial action will be taken such as a diagnostic fault code being set in the control module or an alarm/service lamp being activated for the vehicle operator to take action. Additionally, the vehicle control module may invoke a "safe mode" engine operation condition to prevent engine damage and/or a walk home situation.

Still referring to FIG. 3, in accordance with the exemplary embodiment, the line graph 80 includes correlative information between crankshaft angles and actuator pin positions wherein pin position 92 correlates to a first crank angle, e.g., 10°, that extends beyond a first predetermined position threshold 86 but extends less than a second predetermined position threshold 88. A second pin position 94 extends beyond the second predetermined position threshold 88 and correlates to a second relative crank angle, e.g., 20°, which indicates that the actuator pin is considered fully extended at this crank angle. Finally, a third pin position 96 is above the third predetermined position threshold 84 indicative of the actuator pin being fully retracted. In this instance, the third pin position will correlate to a third crank angle, e.g., 355°, of the duty cycle. It is appreciated that the correlations between the crank angles and pin positions provided are merely exemplary and are not intended to limit the scope of the disclosure.

Figure 4:
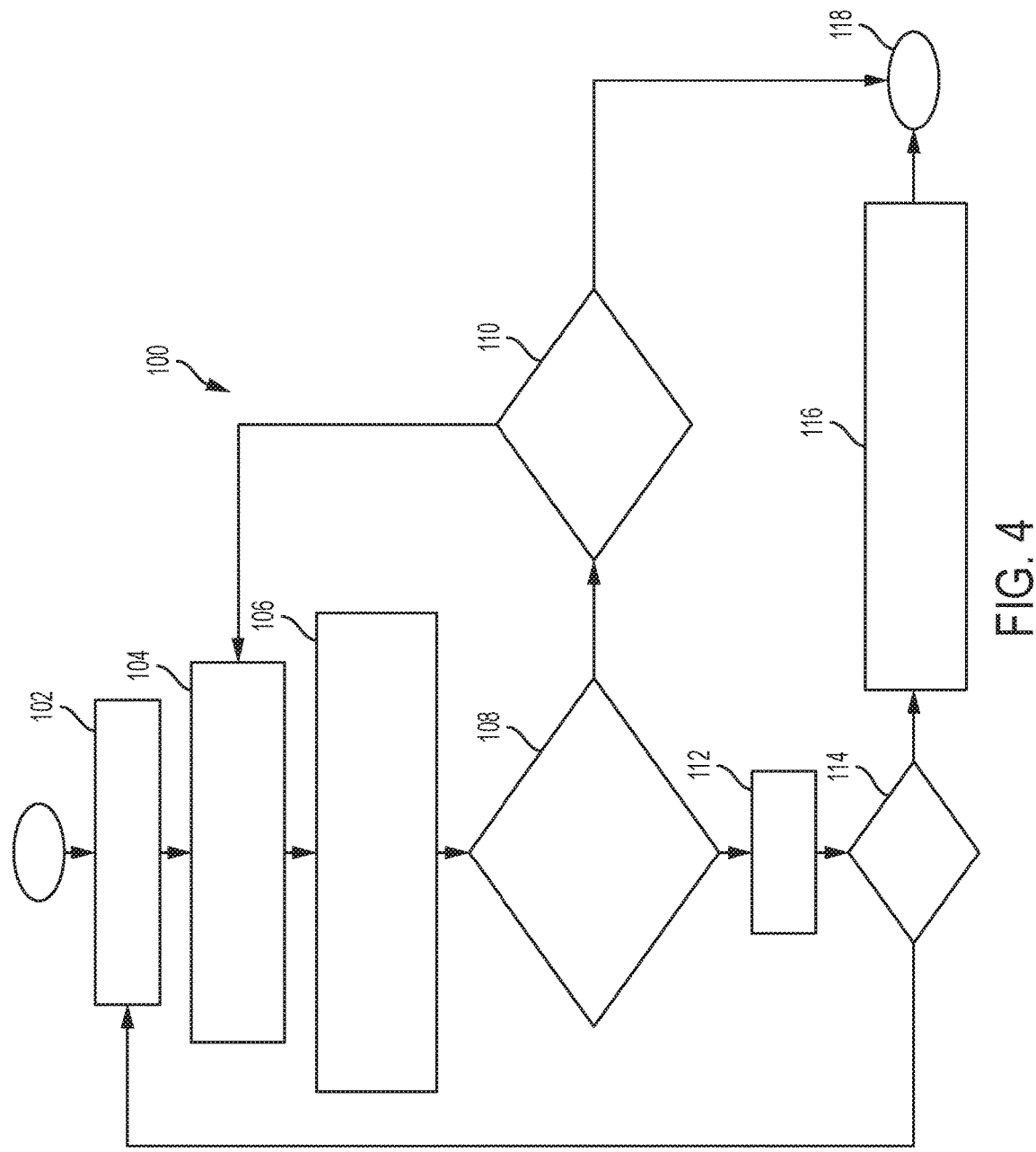
FIG. 4 is an illustration of an algorithm for a method of determining a sliding camshaft actuator pin position based on engine crankshaft angle in accordance with the exemplary embodiment.

Referring now to FIG. 4, an algorithm 100 for a method of determining a sliding camshaft actuator pin position based on engine crankshaft angle in accordance with the exemplary embodiment is provided.

At block 102, the method begins with commanding a camshaft actuator to perform a valve step shift. The control module is configured for commanding the camshaft system to perform valve step shift in response to changes in vehicle operating conditions such as vehicle load, driver input, and road conditions.

At block 104, the method continues with monitoring the actuator's pin position during the valve shift command duty cycle. In accordance with the exemplary embodiment, pin position is monitored using a Hall Effect sensing device integrated within the camshaft actuator and the output signal is communicated to the control module for processing.

At block 106, the method continues with measuring at least one crank angle when the actuator pin reaches or exceeds at least one predetermined position threshold during shift command duty cycle. The at least one crank angle is measured using a crank sensor and then, at block 108, it is determined if the actuator's pin position correlates to the at least one crank angle.

At block 110, if the actuator's pins position correlates to the at least one crank angle then the method continues to block 110 where it is determined if the valve step shift command duty cycle is complete. If not, the method returns to block 104 to continue the pin position monitoring. If the valve step shift command duty cycle is complete then the method ends at block 118.

At block 112, if the actuator's pins position does not correlate to the at least one crank angle then the method increments a fail counter and then, at block 114, the method determines is the fail counter is equal to a predetermined fail threshold, e.g., two (2). If the fail counter is determined to be less than two (2) then the method returns to block 102 to repeat the valve step shift command. If the fail counter is determined to equal two (2) then, at block 116, the method continues with performing at least one remedial action when the actuator pin position does not correlate to the at least one crank angle.

The detailed description provides those skilled in the art with a convenient road map for implementing the exemplary embodiment or exemplary embodiments. Many modifications and variations will be apparent to those of ordinary skill in the art without departing from the scope and spirit of the invention. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of determining a sliding camshaft actuator pin position based on engine crankshaft angle comprising:
   commanding a sliding camshaft actuator to perform a valve step shift;
   monitoring an actuator pin position during the valve step shift command;
   measuring at least one crank angle when the actuator pin position reaches or exceeds at least one predetermined position threshold; and
   performing at least one remedial action when the actuator pin position does not correlate to the at least one measured crank angle at least two consecutive times.

2. The method of claim 1 wherein monitoring further comprising using a Hall Effect sensor to determine the actuator pin position.

3. The method of claim 1 wherein measuring further comprises using a crank sensor and at least one camshaft sensor to determine the crank angle.

4. The method of claim 1 further comprising measuring a first crank angle when the actuator pin position extends to greater than or equal to a first predetermined position threshold.

5. The method of claim 1 further comprising measuring a second crank angle when the actuator pin position extends to greater than or equal to a second predetermined position threshold.

6. The method of claim 1 further comprising measuring a third crank angle when the actuator pin position retracts to less than or equal to a third predetermined position threshold.

7. The method of claim 1 wherein performing at least one remedial action further comprises setting a diagnostic fault code.

8. The method of claim 1 wherein performing at least one remedial action further comprises activating a service lamp/alarm.

9. The method of claim 1 further comprising performing at least one remedial action when the actuator pin position does not reach or exceed at least one predetermined position threshold.

10. A method of determining a sliding camshaft actuator pin position based on engine crankshaft angle comprising:
    commanding a sliding camshaft actuator to perform a valve step shift;
    monitoring an actuator pin position during the valve step shift command;
    measuring a first crank angle when the actuator pin position extends to greater than or equal to a first predetermined position threshold;
    measuring a second crank angle when the actuator pin position extends to greater than or equal to a second predetermined position threshold;
    measuring a third crank angle when the actuator pin position retracts to less than or equal to a third predetermined position threshold; and
    performing at least one remedial action when the actuator pin position does not correlate to the at least one measured crank angle.

11. The method of claim 10 further comprising performing the at least one remedial action after the actuator pin position does not correlate to the at least one measured crank angle two consecutive times.

12. The method of claim 10 wherein monitoring further comprising using a Hall Effect sensor to determine the actuator pin position.

13. The method of claim 10 wherein measuring further comprises using a crank sensor to determine the crank angle.

14. The method of claim 10 wherein performing at least one remedial action further comprises setting a diagnostic fault code.

15. The method of claim 10 wherein performing at least one remedial action further comprises activating a service lamp/alarm.

16. The method of claim 10 further comprising performing at least one remedial action when the actuator pin position does not reach or exceed at least one predetermined position threshold.

17. A method of determining a sliding camshaft actuator pin position based on engine crankshaft angle comprising:
    commanding a sliding camshaft actuator to perform a valve step shift;
    monitoring an actuator pin position during the valve step shift command;

measuring a first crank angle when the actuator pin position extends to greater than or equal to a first predetermined position threshold;

measuring a second crank angle when the actuator pin position extends to greater than or equal to a second predetermined position threshold;

measuring a third crank angle when the actuator pin position retracts to less than or equal to a third predetermined position threshold; and performing at least one remedial action when the actuator pin position does not correlate to the at least one measured crank angle, or when the actuator pin position does not reach or exceed at least one predetermined position threshold.

18. The method of claim 17 further comprising performing the at least one remedial action after the actuator pin position does not correlate to the at least one measured crank angle two consecutive times.

19. The method of claim 17 wherein performing at least one remedial action further comprises setting a diagnostic fault code.

\* \* \* \* \*